United States Patent [19]
Willacy

[11] Patent Number: 5,499,549
[45] Date of Patent: Mar. 19, 1996

[54] GEAR ARRANGEMENT

[75] Inventor: Stephen J. Willacy, West Yorkshire, England

[73] Assignee: Lucas Industries Public Limited Company, England

[21] Appl. No.: 302,614

[22] Filed: Sep. 7, 1994

[30] Foreign Application Priority Data

Sep. 18, 1993 [GB] United Kingdom ............ 9319359

[51] Int. Cl.⁶ .................................................. F16H 1/20
[52] U.S. Cl. .................................. 74/422; 74/409
[58] Field of Search .................... 74/89.17, 409, 74/422

[56] References Cited

U.S. PATENT DOCUMENTS 2,548,603  4/1951  Hallstrand .
4,263,816  4/1981  Adams ............................ 74/422
4,516,663  5/1985  D'Alessio et al. ............... 74/422

FOREIGN PATENT DOCUMENTS 2311236  12/1976  France .
3727370   3/1989  Germany .
8908735   8/1989  Germany .
4317997  11/1992  Japan .

*Primary Examiner*—Charles A. Marmor
*Assistant Examiner*—Chong H. Kim
*Attorney, Agent, or Firm*—Andrus, Sceales, Starke & Sawall

[57] ABSTRACT

A gear arrangement for interconnecting a pair of gear wheels which are carried on rotary shafts the rotary axes of which intersect, comprise a toothed rack having two rows of teeth for engagement with the wheels respectively. The rack is resiliently biased into engagement with the gear wheels.

5 Claims, 2 Drawing Sheets

5,499,549

1
GEAR ARRANGEMENT

BACKGROUND OF THE INVENTION

The present invention relates to a gear arrangement, for instance for use in a rotary position transducer.

It is known to measure the rotary position of a shaft by using a spur gear arrangement as shown in FIG. 1 of the accompanying drawings. The gear shafts 1 and 2 are held within a housing (not shown) so as to hold the gears 3 and 4 in engagement. The shaft 1 is the shaft whose rotary position is to be determined and the shaft 2 is coupled to or forms part of a potentiometer. The housing and the gears are made of different materials. For example, the gears may be steel so that the gears are strong, but the housing may be of aluminium or an alloy so as to reduce the overall weight of the arrangement. Weight reduction may be especially important in an aeronautical application.

However, using different materials for the gears and the housing gives rise to the possibility of differential thermal expansion between the material of the gears and the material of the housing causing the meshing of the gears to be affected by temperature. Thus, changes in temperature change the distance by which the gear teeth interlock. Such changes in distance introduce backlash between the gears and produce errors in the measurement of the position of the shaft.

It is further known to provide an intermediate gear in the form of an elongate rack 5 biased by springs 6 into engagement with the gears 3 and 4, as shown in FIG. 2. However, if the housing and the rack are formed from different materials temperature changes can introduce spurious measurements since the relative expansion of the rack and housing can cause one of the gears to rotate when the other gear remains stationary.

SUMMARY OF THE INVENTION

According to the invention, there is provided a gear arrangement comprising a first gear mounted on a first shaft having a first axis, a second gear mounted on a second shaft having a second axis, and a linear rack having first and second rows of teeth resiliently biased into engagement with the first and second gears, respectively, said first and second axes substantially intersecting each other.

Preferably the first and second axes are perpendicular to each other.

Preferably the teeth of the first row project in a plane perpendicular to a plane in which the teeth of the second row project.

Thus the rack maintains uniform engagement with the first and second gears substantially irrespective of the degree of thermal expansion exhibited by the first and second gears or by a housing or supporting structure, so that it is thus possible to provide a gear arrangement in which thermal expansion does not affect the amount of backlash. Thus the gear arrangement may be designed to have minimal backlash. Furthermore, minimising the separation of the first and second gears in a direction parallel to the longitudinal axis of the rack reduces temperature induced measurement errors due to differential thermal expansion.

BRIEF DESCRIPTION OF THE PREFERRED EMBODIMENT

The present invention will further be described, by way of example, with reference to the accompanying drawings, in which:

2

DETAILED DESCRIPTION OF THE PREFERRED EMBODIMENT

Figure 1:
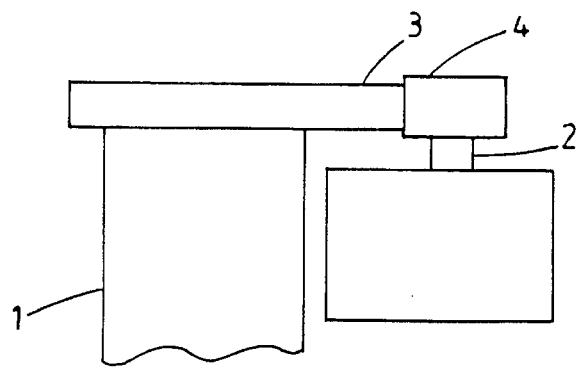
FIG. 1 is a diagram of a known rotary measurement transducer using a spur gear.
Figure 2:
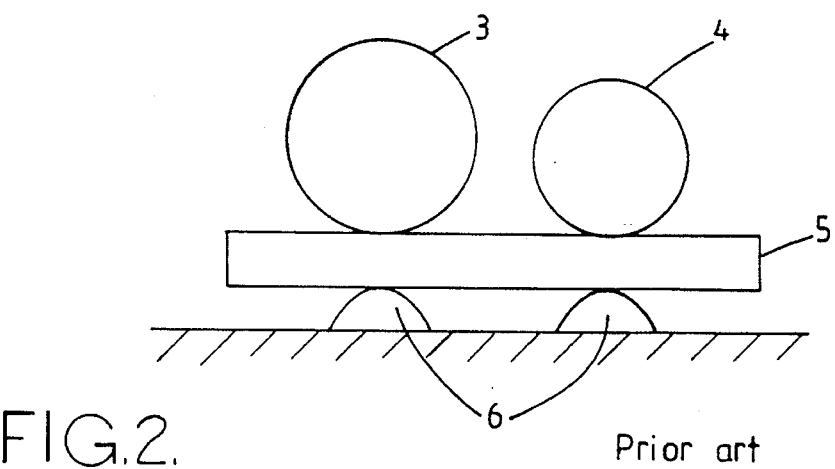
FIG. 2 is a diagram of a known rotary measurement transducer using an intermediate gear in the form of a rack.
Figure 3:
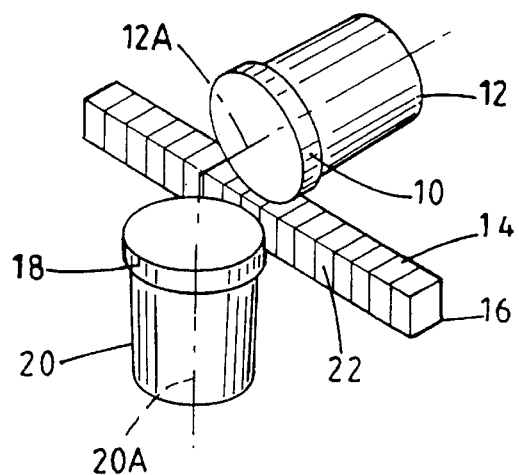
FIG. 3 is a perspective view of a rotary position transducer including a gear arrangement constituting an embodiment of the present invention.

As shown in FIG. 3, a first gear 10 is carried on a drive shaft 12 whose angular position is to be measured, the shaft having an axis of rotation 12A. The gear 10 may be formed as radially extending gear teeth integral with the shaft 12. The gear 10 engages a first row of teeth 14 of a rack 16. The rack 16 is movable in a direction parallel to its longitudinal axis. A second gear 18 is attached to the input shaft 20 of a position transducer such as a rotary potentiometer and engages a second row of teeth 22 on a second side of the rack 16, the input shaft has an axis of rotation 20A. The first and second rows of teeth 14 and 22 extend parallel to the longitudinal axis of the rack 16 and the teeth of the first and second rows project perpendicularly to each other.

The rack 16 transmits drive from the first gear 10 to the second gear 18. The rack 16 is urged into contact with the first and second gears 10 and 18 conveniently by resilient means, so as to maintain engagement with the gears irrespective of relative movement between the gears due to thermal expansion of the gears or of the housing (not shown) supporting the gears.

The axes of rotation of the first and second gears 10 and 18 are perpendicular and intersect each other and define a plane which is perpendicular to the longitudinal axis of the rack 16.

Figure 4:
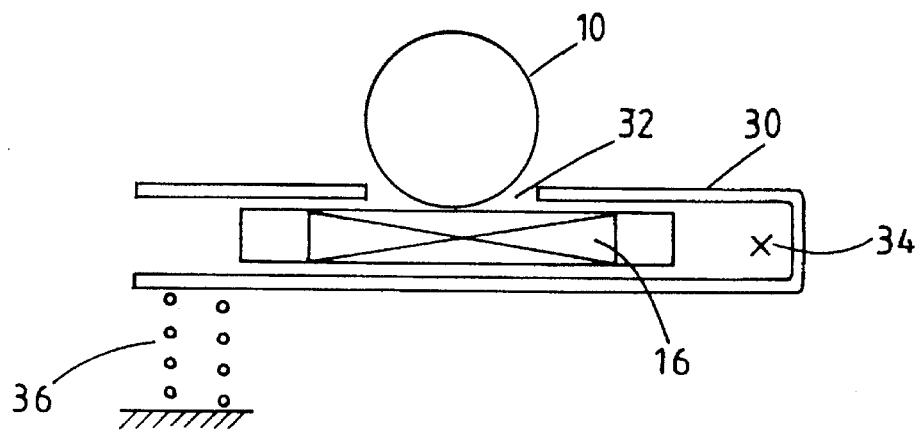
FIG. 4 is a schematic cross-sectional view of an embodiment of the present invention, showing an arrangement for supporting a rack.

A support for the rack is shown in FIG. 4. The rack 16 is contained within a sleeve 30, the dimensions of the sleeve 30 being chosen such that the rack 16 is slidable within the sleeve but held substantially coaxial with the sleeve. An opening 32 cut into adjacent side walls of the sleeve 30 allows the rack 16 to engage with the first and second gears, only the first gear 10 being shown in FIG. 4. The sleeve 30 is pivotally mounted at one end on a pivot 34 which is constructed to allow the sleeve 30 to move towards and away from the first and second gears. A spring 36 acts on the sleeve 30 adjacent its other end to urge the sleeve towards the first and second gears and thereby hold the gears and the rack 16 in meshing engagement. The axis of the spring is aligned so that force components are produced which urge the rack 16 into engagement with both gears 10 and 20. Relative movement between the axes of rotation of the first and second gears and the pivot 34 due to thermal expansion and contraction are accommodated by pivotal movement of the sleeve 30 so that the meshing of the gears is not affected by temperature. Similarly expansion of the first and second gears is also accommodated by pivoting of the sleeve 30.

Figure 5:
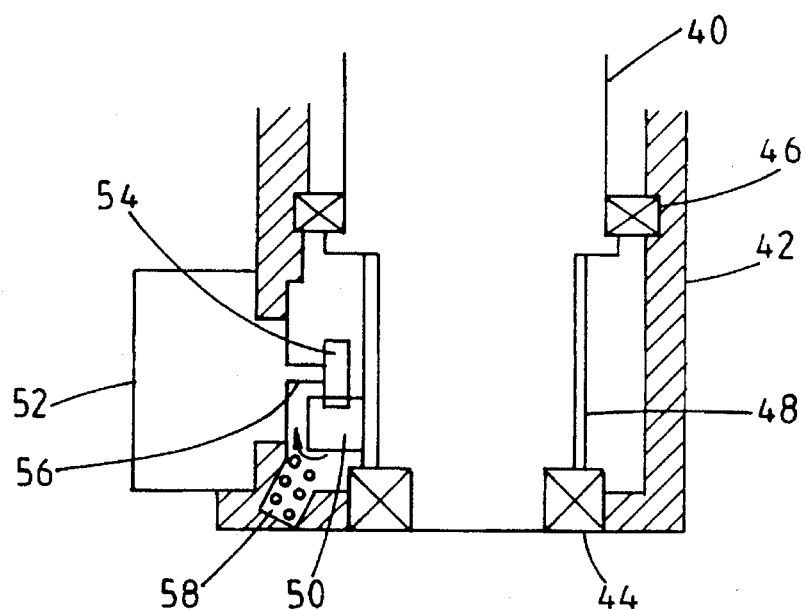
FIG. 5 is a cross-sectional view of a further embodiment of the present invention.

FIG. 5 shows a further embodiment of the present invention. A drive shaft 40, whose angular position is to be measured, is supported within a housing 42 by bearings 44 and 46. A toothed portion 48 of the shaft 40 engages the teeth of a rack 50 which are formed on a first surface thereof. A rotary potentiometer 52, held within the housing 42, has a gear 54 secured to an input shaft 56, the teeth of the gear engaging teeth formed on a second surface of the rack 50. The axes of rotation of the potentiometer input shaft 56 and the drive shaft 40 are perpendicular and intersect. The rack 50 may be slidable within a sleeve of the type described with reference to FIG. 4, the sleeve being omitted from FIG. 5 for the sake of clarity. A spring 58 secured within a recess within the housing 42 urges the two series of teeth of the rack into engagement with the toothed portion 48 of the shaft and the teeth of the gear 54 respectively. It will be noted that the axis of the spring 58 is inclined so as to produce the components of force mentioned in relation to the examples of FIG. 4.

Thermal expansion and contraction act so as to cause relative movement between the drive shaft 40 and the input shaft of the potentiometer 52 with components of that movement parallel to the directions of arrows A and B. The rack 50 moves to accommodate such movements.

Thus, thermal expansion of the gears and housing does not substantially alter the engagement of the gears 48 and 54 with the rack 50. Consequently backlash between the gears is substantially eliminated and the rotary position of the shaft 40 can be derived with high accuracy.

Moreover, as will be seen from FIG. 5 the perpendicular arrangement of the two shafts means that the potentiometer can be mounted on the side of the housing where it is readily accessible for adjustment and/or repair. Moreover, the perpendicular arrangement also enables a large gear ratio to be obtained without the need to consider the spacing between the axes of the shafts.

I claim:

1. A gear arrangement comprising a first gear mounted on a first shaft having a first axis of rotation, a second gear mounted on a second shaft having a second axis of rotation, and a linear rack having first and second rows of teeth which are resiliently biased into engagement with the first and second gears respectively, said first and second axes intersecting each other.

2. A gear arrangement according to claim 1, including resilient means acting to bias the rack into engagement with the gears.

3. A gear arrangement according to claim 2, in which said resilient means comprises a coiled compression spring having a longitudinal axis which is aligned so as to generate force components which urge the rack into engagement with the first and second gears.

4. A gear arrangement according to claim 3, in which the rack is slidably located within a sleeve, the sleeve defining an aperture to permit engagement of the rack with the gear wheels, the spring acting on the sleeve adjacent one end thereof and the sleeve being pivotally mounted on a pivot located adjacent the other end of the sleeve.

5. A gear arrangement according to claim 1, in which said first and second axes are perpendicular to each other.

\* \* \* \* \*